US010855049B2

(12) United States Patent
Pronin et al.

(10) Patent No.: US 10,855,049 B2
(45) Date of Patent: Dec. 1, 2020

(54) PULSE LASER APPARATUS AND METHOD FOR KERR LENS MODE LOCKING BASED CREATION OF LASER PULSES

(71) Applicants: Max-Planck-Gesellschaft zur Foerderung der Wissenschaften e. V., Munich (DE); Ludwig-Maximilians-Universitaet Muenchen, Munich (DE)

(72) Inventors: Oleg Pronin, Garching (DE); Ferenc Krausz, Garching (DE); Jonathan Brons, Oberndorf (DE)

(73) Assignees: Max-Planck-Gesellschaft zur Foerderung der Wissenschaften e.V., Munich (DE); Ludwig-Maximilians-Universitaet Muenchen, Munich (DE)

( * ) Notice: Subject to any disclaimer, the term of this patent is extended or adjusted under 35 U.S.C. 154(b) by 0 days.

(21) Appl. No.: 16/487,365

(22) PCT Filed: Feb. 23, 2017

(86) PCT No.: PCT/EP2017/054200
§ 371 (c)(1),
(2) Date: Aug. 20, 2019

(87) PCT Pub. No.: WO2018/153462
PCT Pub. Date: Aug. 30, 2018

(65) Prior Publication Data
US 2020/0091672 A1 Mar. 19, 2020

(51) Int. Cl.
*H01S 3/098* (2006.01)
*H01S 3/11* (2006.01)
(Continued)

(52) U.S. Cl.
CPC .......... *H01S 3/1112* (2013.01); *H01S 3/0604* (2013.01); *H01S 3/0805* (2013.01);
(Continued)

(58) Field of Classification Search
CPC .... H01S 3/1112; H01S 3/0604; H01S 3/0805; H01S 3/08059; H01S 3/0811;
(Continued)

(56) References Cited

U.S. PATENT DOCUMENTS

| 5,799,025 A * | 8/1998 | Lai .................. H01S 3/1112 372/101 |
| 2007/0086493 A1* | 4/2007 | Apolonski ............ H01S 3/1112 372/18 |

(Continued)

FOREIGN PATENT DOCUMENTS

| EP | 0798825 A2 | 10/1997 |
| WO | 2015047788 A1 | 4/2015 |

OTHER PUBLICATIONS

Brons et al., "Energy scaling of Kerr-lens mode-locked thin-disk oscillators", Optics Letters, vol. 39, No. 22, pp. 6442-6445 (2014).
(Continued)

*Primary Examiner* — Kinam Park
(74) *Attorney, Agent, or Firm* — Caesar Rivise, PC (57) ABSTRACT

A pulse laser apparatus (100) for creating laser pulses (1), in particular soliton laser pulses (1), based on Kerr lens mode locking of a circulating light field in an oscillator cavity (10), comprises at least two resonator mirrors (11, 12, . . . ) spanning a resonator beam path (2) of the oscillator cavity (10), at least one Kerr-medium (21, 22, 23) for introducing self-phase modulation and self-focusing to the circulating light field in the oscillator cavity (10), at least one gain-medium (31) for amplifying the circulating light field in the oscillator cavity (10), and a tuning device (40) for setting a
(Continued)

first mode-locking condition and a second mode-locking condition of the oscillator cavity (10) such that an intracavity threshold-power for mode-locking at the first mode-locking condition is lower than that at the second mode-locking condition, wherein the first mode-locking condition is adapted for starting or shutting-down of the Kerr lens mode locking and the second mode-locking condition is adapted for continuous Kerr lens mode locking and a resonator-internal peak-power of the circulating light field is higher at the second mode-locking condition than at the first mode-locking condition. Furthermore, a method of operating a pulse laser apparatus is described.

36 Claims, 3 Drawing Sheets (51) Int. Cl.
*H01S 3/06* (2006.01)
*H01S 3/08* (2006.01)
*H01S 3/081* (2006.01)
*H01S 3/0941* (2006.01)
*H01S 3/10* (2006.01)
*H01S 3/107* (2006.01)
*H01S 3/109* (2006.01)
*H01S 3/131* (2006.01)
*H01S 3/16* (2006.01)

(52) U.S. Cl.
CPC .......... *H01S 3/0811* (2013.01); *H01S 3/0816* (2013.01); *H01S 3/08059* (2013.01); *H01S 3/09415* (2013.01); *H01S 3/107* (2013.01); *H01S 3/109* (2013.01); *H01S 3/10053* (2013.01); *H01S 3/1106* (2013.01); *H01S 3/1312* (2013.01); *H01S 3/1317* (2013.01); *H01S 3/1618* (2013.01); *H01S 3/1643* (2013.01); *H01S 3/1611* (2013.01); *H01S 2301/085* (2013.01)

(58) Field of Classification Search
CPC .............. H01S 3/0816; H01S 3/09415; H01S 3/10053; H01S 3/107; H01S 3/109; H01S 3/1312; H01S 3/1317; H01S 3/1618; H01S 3/1643; H01S 3/1106; H01S 3/1611; H01S 2301/085
See application file for complete search history.

(56) References Cited

U.S. PATENT DOCUMENTS

2011/0069723 A1\* 3/2011 Dong .................... H01S 3/1618
372/6
2016/0294149 A1\* 10/2016 Vasilyev ............... H01S 3/1628

OTHER PUBLICATIONS

Brons et al., "Powerful 100-fs-scale Kerr-lens mode-locked thin-disk osillator", Optics Letters, vol. 41, No. 15, pp. 3567-3570 (2016).
DeSalvo et al., "Self-focusing and self-defocusing by cascaded second-order effects in KTP", Optics Letters, vol. 17, No. 1, pp. 28-30 (1992).
Han et al., "Controllable harmonic mode locking and multiple pulsing in a Ti:sapphire laser", Optics Express, vol. 16. No. 6, pp. 3686-3692 (2008).
Kalashnikov, "Chirped-Pulse Oscillators: Route to the Energy-Scalable Femtosecond Pulses", pp. 146-184 from Solid State Laser, A. Al-Khursan, ed. (InTech, 2012).
Krausz et al., "Femtosecond Solid-State Lasers", IEEE Journal of Quantum Electronics, vol. 28, No. 10, pp. 2097-2122 (1992).
Lettenberger et al., "Optimized Kerr Lens mode-locking of a pulsed Nd:KGW laser", Optics Communications, vol. 131, pp. 295-300 (1996).
Magni et al., "Astigmatism in Gaussian-beam self-focusing and in resonators for Kerr-Lens mode locking", J. Opt. Soc. Am. B., vol. 12, No. 3, pp. 476-485 (1995).
Mirov et al., "Progress in Mid-IR Lasers Based on Cr and Fe-Doped II-VI Chalcogenides", IEEE Journal of Selected Topics in Quantum Electronics, vol. 21, No. 1, 19 pages (2015).
Penzkofer et al., "Kerr lens effects in a folded-cavity four-mirror linear resonator", Optical and Quantum Electronics, vol. 28, pp. 423-442 (1996).
Pronin et al., "High-power 200 fs Kerr-lens mode-locked Yb: YAG thin-disk oscillator", Optics Letters, vol. 36, No. 24, pp. 4746-4748 (2011).
Pronin et al., "High-power Kerr-lens mode-locked thin-disk oscillator in the anomalous and normal dispersion regimes", Proceedings of SPIE, vol. 8599, 85991N-1-85991N-16 (2013).

\* cited by examiner

PULSE LASER APPARATUS AND METHOD FOR KERR LENS MODE LOCKING BASED CREATION OF LASER PULSES

CROSS-REFERENCE TO RELATED APPLICATIONS

This application is a U.S. National Phase Application of PCT/EP2017/054200, filed Feb. 23, 2017, the contents of which are incorporated herein by reference in their entireties for all purposes.

BACKGROUND OF THE INVENTION

The present invention relates to a pulse laser apparatus for creating laser pulses, in particular soliton laser pulses, based on Kerr lens mode locking of a circulating light field in an oscillator cavity. Furthermore, the present invention relates to a method of creating laser pulses, in particular soliton laser pulses, based on Kerr lens mode locking. Applications of the invention are available e.g. in the fields of laser physics, laser pulse-based measurement techniques and spectroscopy.

In the present specification, reference is made to the following prior art illustrating the technical background of the invention:

[1] V. L. Kalashnikov et al. in "Solid State Laser", A. Al-Khursan, ed. (InTech, 2012), pp. 146-184;
[2] F. Krausz et al. in "J. Quantum Electron." 28, 2097-2122 (1992);
[3] O. Pronin et al. in "Opt. Lett." 36, 4746-4748 (2011);
[4] J. Brons et al. in "Opt. Lett." 41, 3567 (2016);
[5] J. Brons et al. in "Opt. Lett." 39, 6442-6445 (2014);
[6] S. B. Mirov et al. in "IEEE J. Sel. Top. Quantum Electron." 21, 292-310 (2015);
[7] M. Lettenberger et al. in "Opt. Commun." 131, 295-300 (1996);
[8] V. Magni et al. in "J. Opt. Soc. Am." B 12, 476-485 (1995);
[9] A. Penzkofer et al. in "Opt. Quantum Electron." 28, 423-442 (1996);
[10] X. Han et al. in "Opt. Express" 16, 3686 (2008); and
[1] R. DeSalvo et al. in "Opt. Lett." 17, 28-30 (1992).

Periodic trains of laser pulses can be generated in particular with solitonic Kerr-lens mode-locked (KLM) oscillators. A summary of the working principles of solitonic KLM oscillators can be found e.g. in [1]. The starting process of high power, Kerr-lens mode-locked (KLM) oscillators, especially thin-disk KLM oscillators most often requires externally perturbing the continuous wave (CW) steady-state to induce fluctuations from which the mode-locked pulses can emerge. This process can easily result in damage to intra-cavity optical elements if no careful measures are taken to control it. The damage mechanism is subject to research, however, analysis with a fast oscilloscope and photodiode reveal strong, high energy pulses appearing at the transitions from CW-oscillation to mode-locked operation and also when switching from mode-locked operation to CW-oscillation.

Figure 7:
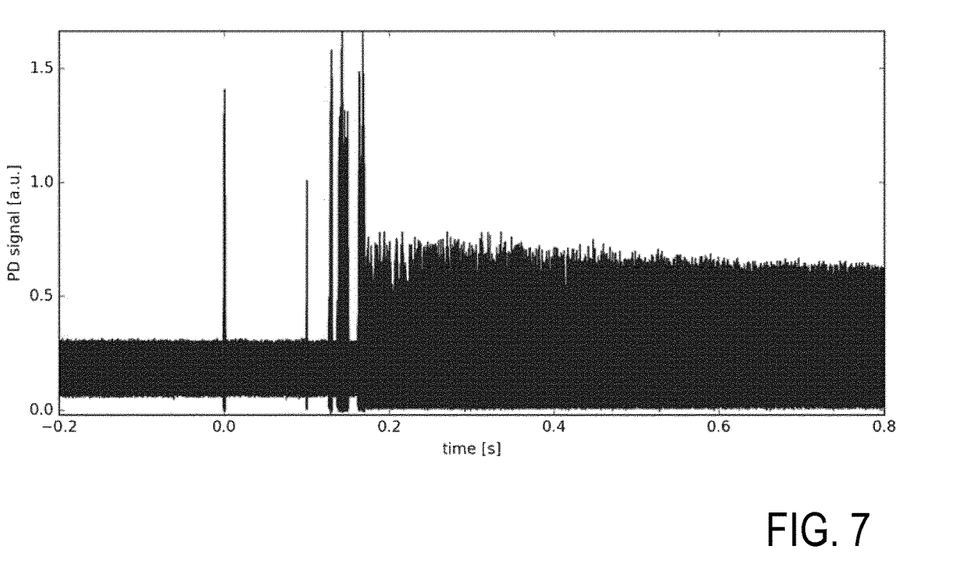
FIGS. 7 and 8: illustrations of the occurrence of spike instabilities of the starting or shut-down processes of conventional KLM oscillators.

An illustrative example of this behavior of conventional KLM oscillators is illustrated in FIG. 7, which shows the violent pulse-buildup with high power/energy/intensity noise spikes when starting the mode-locking operation. These powerful pulses are the most likely cause for optical damage.

It is well known that q-switching or spiking instabilities in passively mode-locked oscillators can be suppressed when the mode-locking device, typically a real (e.g. SESAM) or virtual (e.g. KLM) saturable absorber is easily saturated [2]. However, this means that the maximum power-dependent reflectivity or transmission change is reached already at relatively low instantaneous power of a fluctuation or pulse. Accordingly, if this concept would be used for suppressing the above spiking instabilities, it could be used with KLM oscillators having relative low output power only.

Another solution to avoid such strong pulses is using an additional mode-locking device that saturates mainly with pulse-fluence and not intensity such as a semiconductor saturable absorber mirror (SHAM) as has been reported in [3]. In principle any passive mode-locking device with low saturation-fluence or saturation-intensity can be helpful. However, a decrease of the saturation power of the mode-locking device limits the maximum achievable peak-power from the oscillator again and typically conflicts with the design goals for high power mode-locked oscillators.

Figure 8:
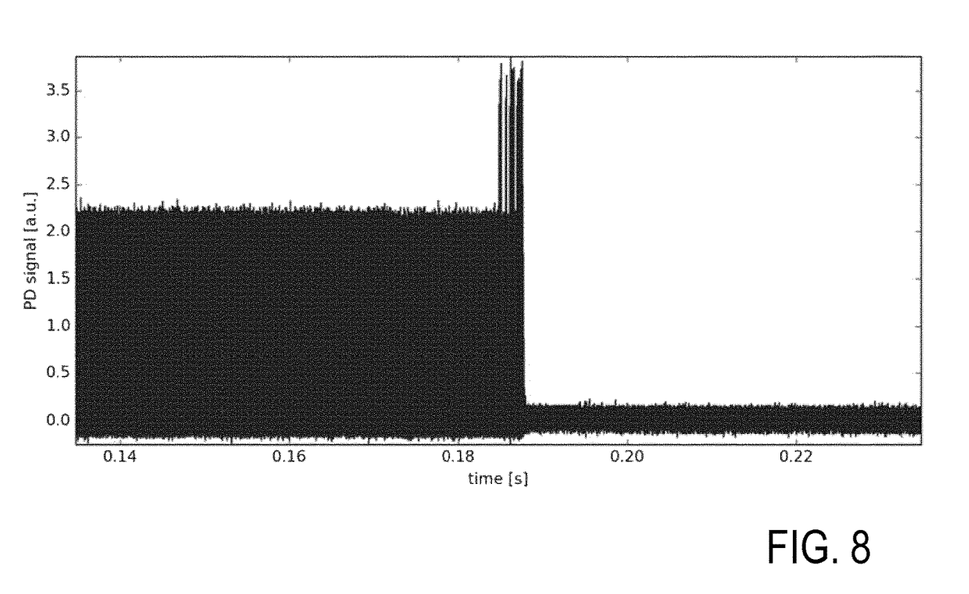

With conventional KLM oscillators, the shutdown procedure (stopping mode-locking operation) might suffer from the same chaotic, dangerous spiking instabilities, as illustrated in FIG. 8, which shows a measured oscilloscope trace of photodiode signal with oscillator output. Spiking behavior is clearly observable on reduction of the gain.

The objective of the invention is to provide an improved pulse laser apparatus and an improved method for creating laser pulses, in particular soliton laser pulses, based on Kerr lens mode locking, being capable of avoiding limitations of conventional techniques. In particular, the pulse laser apparatus and the method are to be capable of optimizing output parameters, such as power, bandwidth and pulse-duration of a KLM oscillator, while at the same time avoiding damage to optical elements during the pulse build-up or shut-down.

These objectives are solved with a pulse laser apparatus and/or a method for creating laser pulses of the invention.

BRIEF SUMMARY OF THE INVENTION

According to a first general aspect of the invention, the above objective is solved by a pulse laser apparatus for creating laser pulses, in particular soliton laser pulses, based on Kerr lens mode locking of a circulating light field in an oscillator cavity. The pulse laser apparatus (or: KLM oscillator) comprises two or preferably more than two resonator mirrors spanning a resonator beam path of the oscillator cavity. Preferably, at least one of the resonator mirrors is an out-coupling mirror for coupling out part of the circulating light field out of the oscillator cavity.

At least one Kerr-medium is arranged in the beam path of the oscillator cavity. Generally, the at least one Kerr-medium is adapted for introducing self-phase modulation and self-focusing to the circulating light field in the oscillator cavity, resulting in a mode-coupling of resonator modes and pulse shape of the circulating light field. Out-coupling a part of the circulating light field results in a pulse train of laser pulses. Furthermore, at least one gain-medium is arranged in the beam path of the oscillator cavity. The gain medium is adapted for amplifying the circulating light field in the oscillator cavity. Preferably, the at least one gain-medium is adapted for providing a soft aperture (gain volume forming the aperture for KLM) in the oscillator cavity. Alternatively or additionally, the oscillator cavity can include a hard aperture for KLM filtering.

According to the invention, the pulse laser apparatus further includes a tuning device being configured for setting a first mode-locking condition and a second mode-locking condition of the oscillator cavity. The first mode-locking condition is adapted for providing an intra-cavity threshold-power for mode-locking which is lower than that at the second mode-locking condition. The first mode-locking condition is adapted for starting or shutting-down of the Kerr lens mode locking and the second mode-locking condition is adapted for continuous Kerr lens mode locking, wherein a resonator-internal peak-power of the circulating light field is higher at the second mode-locking condition than at the first mode-locking condition.

The threshold-power is the lowest continuous wave (CW) power in the oscillator cavity at which the transition to mode-locked operation occurs. The first mode-locking condition (or: starting or shut-down state) is the mode-locking condition, where the Kerr lens mode locking is started or shut-down. The second mode-locking condition (or: running state) is the mode-locking condition, where the Kerr lens mode locking is continuously conducted with an intra-cavity peak power which is higher than in the first operation arrangement, a pulse duration which is shorter than in the first operation arrangement and/or with a single pulse characteristic contrary to multi-pulses created in the first operation arrangement. Setting the oscillator cavity to the first mode-locking condition advantageously allows starting or ending mode-locking operation while avoiding chaotic high power spikes and damages. The second mode-locking condition is provided for operating the pulse laser apparatus with increased output power. The first and second mode-locking conditions are fixed operation states of the oscillator cavity, which in particular are determined by the specification of the oscillator cavity, e.g. the intra-cavity focal length and the Kerr and/or gain media materials. The first and second mode-locking conditions can be found on the basis of numerical simulations of the oscillator behavior, with practical tests or using a control loop mentioned below.

According to a second general aspect of the invention, the above objective is solved by a method of creating laser pulses by operating a pulse laser apparatus having a oscillator cavity with at least two resonator mirrors spanning a resonator beam path of the oscillator cavity, at least one Kerr-medium being configured for introducing self-phase modulation and self-focusing to the circulating light field in the oscillator cavity, and at least one gain-medium being configured for amplifying the circulating light field in the oscillator cavity. Preferably, the inventive method is conducted with the pulse laser apparatus according to the first general aspect of the invention.

The inventive method includes creating laser pulses, in particular soliton laser pulses, based on Kerr lens mode locking of a circulating light field in the oscillator cavity and changing a mode-locking condition of the oscillator cavity between a first mode-locking condition and a second mode-locking condition. According to the invention, an intra-cavity threshold-power for mode-locking at the first mode-locking condition is lower than that at the second mode-locking condition, and starting or shutting-down of the Kerr lens mode locking is provided at the first mode-locking condition and continuous Kerr lens mode locking at increased output power is provided at the second mode-locking condition.

Advantageously, the provision of the tuning device, which is adapted for setting the oscillator cavity to one of the mode-locking conditions, allows the suppression of deteriorating chaotic oscillations on the light field during the pulse-buildup and subsequently the creation of the laser pulses with increased output power. From [6] and [10] it is known that a translation of the Kerr-medium along the focus can result in multiple-pulse operation, harmonic mode-locking, change of the output spectrum and the pulse duration. However, contrary to the conventional KLM oscillators including a translating Kerr medium, the average- and peak-power-level is increased in the second operation arrangement compared with the first operation arrangement, such that damages to the oscillator cavity or other components of the pulse laser apparatus are avoided during the starting and/or shut-down phases.

According to a preferred embodiment of the invention, the first mode-locking condition is selected such that the intra-cavity threshold-power for mode-locking is minimized. The threshold-power is the minimal intra-cavity average power at which a transition to mode-locked operation is possible. Minimizing the threshold-power indicates the first mode-locking condition at which the suppression of chaotic oscillations and spikes is maximized. Preferably, the first mode-locking condition is adapted for a spike-free starting or shut-down process of Kerr lens mode locking.

According to a further preferred embodiment of the invention, the second mode-locking condition is selected such that the resonator-internal peak-power of the circulating light field is maximized. Advantageously, this allows an operation of the pulse laser apparatus with maximum output power. Depending on the dispersion conditions in the oscillator cavity, the intra-cavity oscillator power can reach at least 50 MW, in particular at least 500 MW, in an anomalous dispersion-regime with negative group-delay-dispersion, or at least 5 MW in a normal dispersion regime with positive group-delay-dispersion producing dissipative, chirped solitons. The output peak-power of the pulse laser apparatus correspondingly can reach e.g. at least 5 MW for the anomalous dispersion-regime or at least 0.5 MW (not compressed) for the normal dispersion-regime. These output peak-power represent examples only. Depending on the application, lower output peak-power can be provided, e.g. if intra-cavity experiments are done.

According to another preferred embodiment of the invention, the second mode-locking condition is selected such that the resonator-internal peak-power of the circulating light field is at least 20% higher at the second mode-locking condition than at the first mode-locking condition. Advantageously, this allows new high power applications of the pulse laser apparatus without the risk of influencing the optical components.

Preferably, the oscillator cavity includes one single gain-medium, which particularly preferred comprises a thin-disk gain medium, which is provided separately from the at least one Kerr medium and which is positioned in contact with one of the resonator mirrors (see e.g. [4]). Separating the thin-disk gain medium and the Kerr medium, which in contrast e.g. to [6], has advantages for optimizing the first operation arrangement and second operation arrangement of the at least one Kerr medium.

According to a further preferred embodiment of the invention, the at least one Kerr medium has at least one anti-reflection coating. Advantageously, this supports that the creation of an increased resonator-internal peak-power of the circulating light field at the second mode-locking condition.

According to a further advantage of the invention, multiple types of tuning devices for setting the first and second mode-locking conditions are available which can be provided for acting on a single operation parameter or on operation parameters of the oscillator cavity.

According to a first preferred implementation, the tuning device comprises a translation device including at least one translation stage is arranged in the beam path of the oscillator cavity (first embodiment of the invention). The at least one Kerr-medium is coupled with the translation device. If multiple Kerr media are provided, at least one of them is used for starting the Kerr lens mode-locking and this Kerr medium is coupled with one translation stage of the translation device, or multiple Kerr media are coupled with associated multiple translations stages. The translation device is adapted for changing an operation arrangement of the at least one Kerr-medium in the oscillator cavity. The at least one Kerr-medium can be translated between a first operation arrangement and a second operation arrangement. The first mode-locking condition is provided with the first operation arrangement and the second mode-locking condition is provided with the second operation arrangement of the at least one Kerr-medium. By changing the operation arrangement, a geometric position of the at least one Kerr-medium along the beam path of the oscillator cavity, in particular the distance from a resonator mirror, and/or the thickness of the at least one Kerr-medium introduced in the beam path of the oscillator cavity can be varied. In the first and second operation arrangements, the at least one Kerr-medium has different effects on the process of mode-locking of the oscillator cavity.

According to the first embodiment of the invention, the translation device is adapted for providing the first and second operation arrangements such that the intra-cavity threshold-power for mode-locking at the first operation arrangement is lower than that at the second operation arrangement. Positioning the at least one Kerr medium with the first operation arrangement is adapted for starting or ending mode-locking operation while avoiding chaotic high power spikes and damages. The second operation arrangement is provided for operating the pulse laser apparatus with increased output power. The first and second operation arrangements are fixed positions determined by the specification of the oscillator cavity.

Advantageously, multiple variants are available for setting the first and second operation arrangements, which can be used separately or in combination. According to a first preferred variant, the first and second operation arrangements comprise first and second positions of the at least one Kerr-medium along the resonator beam path. Changing the operation arrangement comprises shifting the at least one Kerr-medium in and out of an intra-cavity focus. Preferably, the first operation arrangement is with the Kerr medium at the intra-cavity focus, in particular in a range of about +/−2% of the focus length of the resonator mirrors around the intra-cavity focus. The focus length is defined by the focal length of the curved mirrors providing the intra-cavity focus (see e.g. FIG. 1 mirrors 12 and 13). In the case of an asymmetric focusing arrangement with the focusing mirrors (e.g. 12 and 13) having different focal lengths, the relevant focus length is the shorter focal length of the two mirrors. The at least one Kerr-medium is translated to the second operation arrangement such that the intra-cavity peak power is increased. The translation distance is selected in a range from about 3% to 10% of the focus length, e.g. by a distance in a range from 3 cm to 10 cm if the focus length is 1 m. With the first operation arrangement, the at least one Kerr medium is shifted by this distance out of the focus towards one of the adjacent resonator mirrors. This embodiment has advantages as it can be used with any type and shape of Kerr media and does not alter the optical beam axis.

According to a second preferred variant, the at least one Kerr-medium comprises a pair of Kerr media wedges, being arranged for a translation having a direction component perpendicular to the resonator beam path such that a total effective thickness of the pair of Kerr media wedges passed by the circulating light field can be adjusted by moving the wedges into or out of the beam path. In this case, the first and second operation arrangements comprise first and second positions of the Kerr media wedges along a radial direction relative to the resonator beam path. This embodiment can have advantages for a compact resonator design.

Preferably, at least one of the Kerr media wedges has an anti-reflective coating, thus reducing intra-cavity losses by reflection. Particularly preferred, the Kerr media wedges have a wedge-angle being selected such that, when placed in the beam-path close to Brewster's angle relative to the beam path, reflection-losses are minimized.

According to a further particularly preferred embodiment of the invention, the operation arrangement is changed by a vibration-free movement of the at least one Kerr-medium. The movement is vibration-free there are no vibrations or only negligible vibrations, which do not disrupt the mode-lock. To this end, the translation device preferably comprises a linear translation stage, e.g. with a servo motor drive. Advantageously, perturbations of the oscillator and unintended changes of the mode-locking state can be avoided with this embodiment.

According to a second preferred implementation, the tuning is configured for changing a phase-mismatch condition of the at least one Kerr medium and/or an additional phase-mismatched type-I second harmonic generation (SHG) crystal being arranged in the resonator beam path of the oscillator cavity for adding second order nonlinearity in the oscillator cavity between a first phase-mismatch condition and a second phase-mismatch condition having a larger phase mismatch of the at least one Kerr medium and/or the SHG crystal than the first phase-mismatch condition (second embodiment of the invention). The phase-mismatch is changed between the first and second mismatch conditions such that the total intra-cavity nonlinearity is lower and the peak-power and/or spectral bandwidth and/or pulse-stability is increased in the second phase-mismatch condition compared with the first phase-mismatch condition. As an example, the phase mismatch can be zero or negligible (i. e. near zero) at the first phase-mismatch condition and increased at the second phase-mismatch condition. The first mode-locking condition is provided with the first phase-mismatch condition and the second mode-locking condition is provided with the second phase-mismatch condition. The first and second phase-mismatch conditions are fixed operation states of the oscillator cavity, which in particular are determined by the specification of the oscillator cavity, e.g. the intra-cavity focal length and the Kerr and/or gain media materials. The first and second phase-mismatch condition can be set using numerical simulations of the oscillator behavior, practical tests or a control loop.

Preferably, the tuning device is configured for tuning at least one of the temperature and the angle of incidence of the at least one Kerr medium and/or the SHG crystal relative to the resonator beam path of the oscillator cavity. In the first case, the tuning device comprises a crystal tempering device, e.g. a temperature controlled support stage of the at least one Kerr medium and/or the SHG crystal, like a crystal tempering oven. In the second case, the tuning device comprises crystal rotating device, e.g. a pivotable support stage of the at least one Kerr medium and/or the SHG crystal allowing turning the at least one Kerr medium and/or the SHG crystal with an axis perpendicular to the resonator beam path.

Advantageously, with the second embodiment, the at least one Kerr medium and/or the additional SHG crystal introduces second order nonlinearity (or: cascaded quadratic nonlinear interactions) in the resonator beam path. The nonlinearity can in this case be defined, e.g. as in reference [11], such that the nonlinear phase-shift due to a transmissive element originates from a total nonlinear refractive index that is constituted by the sum of the cubic (Kerr) nonlinear refractive index and the quadratic (cascading) effective nonlinear refractive index. Therefore an increased nonlinearity means an increase of the total nonlinear phase-shift per roundtrip through the oscillator cavity due to the sum of the effective nonlinear refractive indexes from all elements inside the oscillator cavity. The generation of second harmonic radiation can be low due to the phase-mismatch such that the circulating mode-locked light field suffers negligible spectral losses from second harmonic generation. Advantageously, the saturation of the self-amplitude modulation in the oscillator cavity and thus the mode-locking starting conditions can be influenced by the second order nonlinearity.

According to another variant of the second embodiment of the invention, the SHG crystal can fulfil a double function in terms of introducing nonlinearity to the oscillator cavity and Kerr lens mode-locking. Accordingly, the Kerr medium can be provided by a phase-mismatched type-I second harmonic generation (SHG) crystal having the features of the SHG crystal noted above, and the tuning device of the second embodiment of the invention can set the mode-locking condition of the Kerr medium.

The first and second embodiments of the invention can be combined, i. e. the starting or shut-down state and the running state can be set by any combination of the translation device, the crystal tempering device crystal and/or the rotating device. For example, the first phase-mismatch condition can be provided when the at least one Kerr-medium has the first operation arrangement and the second phase-mismatch condition can be provided when the at least one Kerr-medium has the second operation arrangement.

Further advantages for the operation stability are obtained if at least one of a pump-power and a gain of the at least one gain medium are controlled, e.g. by an operation adjustment device, such that the oscillator cavity is kept mode-locked while changing the operation arrangement between the first and second operation arrangements.

Advantageously, a detector device can be provided for detecting a Kerr lens mode locking condition, in particular the resonator-internal peak-power of the circulating light field, the pulse duration and/or the single or multi pulse characteristic of the circulating light field. The detector device allows a monitoring of the oscillator cavity operation while changing the operation arrangement between the first and second operation arrangements.

According to a further preferred embodiment of the invention, a control loop is provided, preferably including the detector device and the operation adjustment device. Advantageously, the control loop allows controlling the translation device in dependency on a detector device output and keeping the oscillator mode-locked while changing the operation arrangement.

BRIEF DESCRIPTION OF THE DRAWINGS

Further details and advantages of the invention are described in the following with reference to the attached drawings, which show in.

DETAILED DESCRIPTION OF PREFERRED EMBODIMENTS

Features of the invention are described in the following with exemplary reference to a linear resonator including one Kerr medium and one separate gain medium. The invention is not restricted to this embodiment, but rather can be implemented with multiple Kerr media and/or multiple gain media or one single common Kerr and gain medium. Details of operating a KLM oscillator are not described as they are known as such from prior art techniques. In particular, the pulse laser apparatus can be operated as described with reference to the working principles of solitonic mode-locked oscillators disclosed in [3].

Figure 1:
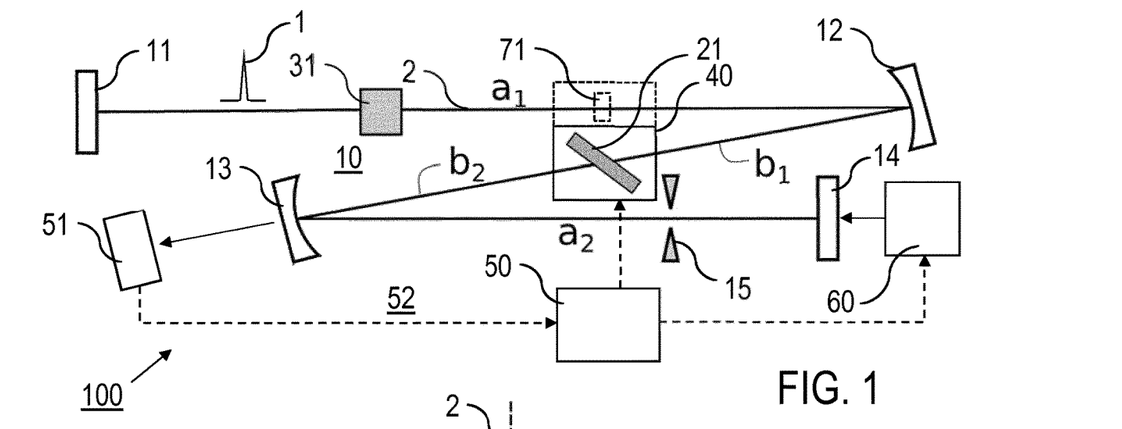
FIG. 1: a schematic illustration of a pulse laser apparatus according to preferred embodiments of the invention.

FIG. 1 shows a schematic overview of a pulse laser apparatus 100 for creating laser pulses 1 according to the invention, including an oscillator cavity 10 with four resonator mirrors 11, 12, 13 and 14, and a pump source 60, like e.g. a cw diode laser (e.g. 940 nm fiber coupled cw diode laser with more than 100 W pump power. The resonator mirrors 11, 12, 13 and 14 span a beam path 2, including the Kerr medium 21, the gain medium 31, an optional SHG crystal 71 (shown with dashed line) and a hard aperture 15. One of the resonator mirrors, e.g. 11, is an out-coupling mirror, and, if a bulk gain medium is used as shown in FIG. 1, another one of the resonator mirrors, e.g. 14, is arranged for in-coupling pump light from the pump source 60. The reflective region of one of the resonator mirrors can be used as an aperture (hard aperture 15). Additionally, the oscillator cavity 10 includes at least one device introducing dispersion (especially group-delay-dispersion), which is not shown, but can be implemented by one of the resonator mirrors (as a dispersive mirror).

The Kerr medium 21 comprises e.g. a sapphire plate having a thickness of 1 mm to 5 mm and being arranged with the Brewster angle relative to the beam path 2. The Kerr medium 21 is supported by a translation device providing the tuning device 40, comprising a single translation stage like e.g. a motorized support table or manually adjustable table. The translation device 40 is adapted for a translation velocity of e.g. about 5 s to 10 s for a translation over some cm. Depending on the application conditions, in particular depending on noise introduced by the translations device 40, a faster or slower translation can be provided. With the translation device 40, the Kerr medium 21 can be moved along the beam path 2 for setting one of the first and second operation arrangements for starting the mode-locking and stably running the pulse laser source 100 as outlined below. To this end, the translation device 40 is coupled with an operation adjustment device 50, which comprises a computer based control circuit, setting the operation arrangements of the Kerr medium 21. The gain medium 31 can be arranged as a bulk gain material as shown or preferably as a thin-disk gain medium, e.g. Yb:YAG in direct contact with one of the resonator mirrors, e.g. 12, or in contact with an additional folding-mirror.

It is noted that FIG. 1 is only a schematic illustration of the pulse laser apparatus 100. For example, more than four resonator mirrors can be provided in practice. Furthermore, if the thin-disk gain medium is used, the pump-light is directed from a separate pump-chamber onto the thin disk medium, so that the pump-light does not coincide with the laser mode and no in-coupling mirror is provided. According to a preferred embodiment of the invention, the pulse laser apparatus 100 can have the resonator setup of the Kerr-lens mode-locked thin-disk oscillator disclosed in [4]. With regard to the resonator setup, in particular the arrangement of resonator mirrors, gain medium and Kerr medium, [4] is introduced to the present specification by reference. With this embodiment, the pulse laser apparatus 100 has a linear oscillator cavity with relatively high intra-cavity GDD of −12.000 fs$^2$, introduced by dispersive mirror coatings. The gain is provided by an Yb:YAG thin-disk and 15% of the circulating power are coupled out each roundtrip with a pulse repetition rate of about 16 MHz. A focusing arrangement consisting of two concave mirrors with 2000 mm radius of curvature provide a focus where a 5 mm thick sapphire plate acts as the main Kerr-medium. The oscillator worked in an air atmosphere with reduced pressure. Mode-locking is started in the first operation arrangement at 0 mm by slight movement of a mirror pair. Damage is avoided. The Kerr-medium position is then shifted to the second operation arrangement nearly 60 mm away from the starting position where it stays until the oscillator is shut down again.

According to another alternative, the pulse laser apparatus 100 can have the resonator setup of the Kerr-lens mode-locked thin-disk oscillator disclosed in [5] (operation in normal atmosphere). There, the intra-cavity GDD values were varied between −48.000 fs$^2$ and −18.000 fs$^2$ and a focusing section with 900 mm radius of curvature was introduced, including a 1 mm thick sapphire Kerr-medium. An output coupler transmitted 21% of the circulating pulses with an intra-cavity peak-power of about 180 MW.

The saturation of the self-amplitude modulation can be influenced by second order nonlinearities, also called cascaded quadratic nonlinear interactions, in particular by phase-mismatched second-harmonic generation (see [11]). By placing the phase-mismatched type-I second harmonic generation crystal 71, e.g. a beta-barium borate (BBO) crystal or a lithium triborate (LBO) crystal, inside the oscillator beam-path (second embodiment of the invention), e.g. between mirrors 11 and 12 or in another folding branch of the oscillator cavity, and detuning from phase-matching it is possible to control the amount of nonlinear phase-shift accumulated by the intra-cavity pulse and also the amount of self-focusing. Type I phase-mismatch can be controlled with the tuning device 40 (shown with dashed line) either by angle-tuning (e.g. BBO) with a crystal rotating device and/or by temperature tuning (e.g. LBO) with a crystal tempering device of the SHG crystal 71. The nonlinear phase-shift can be chosen either positive or negative such that self-focusing or self-defocusing is possible. If the second harmonic generation crystal 71 is provided, translating the Kerr medium according to the first embodiment of the invention can be omitted.

Preferably, tempering the SHG crystal 71 is provided. The crystal tempering device comprises e.g. an oven setting a crystal temperature of 250° C. as the first mode-locking condition and increasing or decreasing the temperature for tuning to the second mode-locking condition, where the phase mismatch is increased compared with the first mode-locking condition. If the second embodiment of the invention is implemented without the translation device of the first embodiment, any moving components of the tuning device can be avoided.

Figure 2:
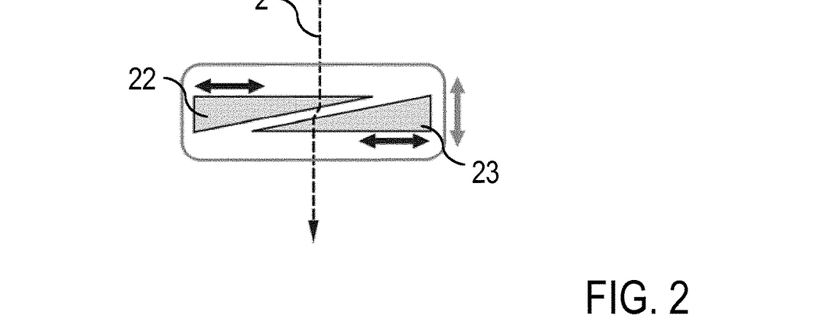
FIG. 2: an illustration of the provision of Kerr media wedges.

According to yet another embodiment of the invention, the Kerr medium 21 e.g. of FIG. 1 can be replaced by wedge shaped Kerr media 22, 23 as shown in FIG. 2. Kerr media 22, 23 comprise two wedges, e.g. of sapphire, which can be translated along a direction having component perpendicular to the beam path 2 (the transmitted laser field propagation) of the oscillator cavity. Kerr media 22, 23 are translated with two translation stages (not shown in FIG. 2). The translatable wedge shaped Kerr media can also be combined with a normal Kerr medium that can be translated along the beam-path.

Additionally, the pulse laser apparatus 100 includes a detector device 51, like e.g. a photodiode, monitoring a part of the circulating light field in the oscillator cavity 10. Preferably, an output signal of the detector device 51 is supplied to the operation adjustment device 50, which is coupled for providing a control loop 52 with at least one of the translation device 40, the pump source device 60 and the gain medium 31. With the control loop 52, at least one of these components is controlled in dependency on the output signal for keeping the mode-locked operation of the pulse laser apparatus 100. Providing the control loop 52 is not necessary, if the first operation arrangement and the second operation arrangement of the Kerr medium 21 can be adjusted based on predetermined numerical simulations of the cavity behavior or based on experimental tests.

Figure 3:
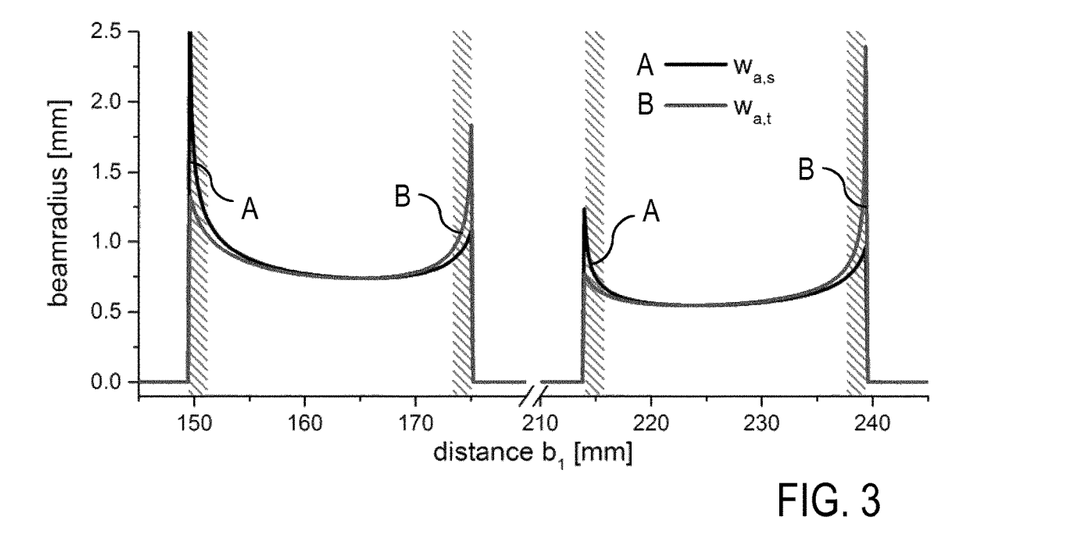
FIG. 3: a graphical representation of stability ranges of a pulse laser apparatus.

Depending on, e.g. the distance $b_1$ between the resonator mirror 12 and the Kerr medium 21, two stability zones can be identified for which there exist Gaussian TEMOO modes. These can be calculated with, e.g., the ray-transfer matrix method. For ring cavities only one stability zone exists. FIG. 3 illustrates the mode-radii $w_{a,s}$ (curve A) and $w_{a,t}$ (curve B) in the sagittal and tangential planes over the stability-regions of an example KLM oscillator (e.g. as shown in FIG. 1). Kerr-lens mode-locking is provided when the oscillator cavity is operated in the vicinity of the stability edges (e.g. FIG. 3, shaded areas) where the oscillator mode is highly susceptible to changes of any intra-cavity lens's focal length. In general, a high sensitivity (initial slope) of the net roundtrip gain to the instantaneous pulse-power is considered beneficial for the pulse buildup process and is specifically helpful for self-starting mode-locked lasers [1]. The invention works with both modi, when the oscillator is self-starting or requires external perturbation to initiate mode-locking.

The oscillator cavity 10 of the pulse laser apparatus 100, e.g. according to FIG. 1, is adjusted to one of the stability edges via adjusting $b_1$ and $b_2$ in order to facilitate Kerr-lens mode-locking. The sum of $b_1$ and $b_2$ is kept constant and the position of the Kerr-medium 21 is characterized e.g. by distance $b_2$. The action of the Kerr-lens induced in the Kerr-medium 21 is to modulate the power-transmission of the cavity-mode at an intra-cavity aperture. This has been calculated numerically and plotted in FIG. 4, which in particular shows the power dependent transmission through the intra-cavity hard aperture 15 in dependency on the Kerr-medium 21 position $b_2$ (see FIG. 1). The initial slopes and their values are given as well.

Figure 4:
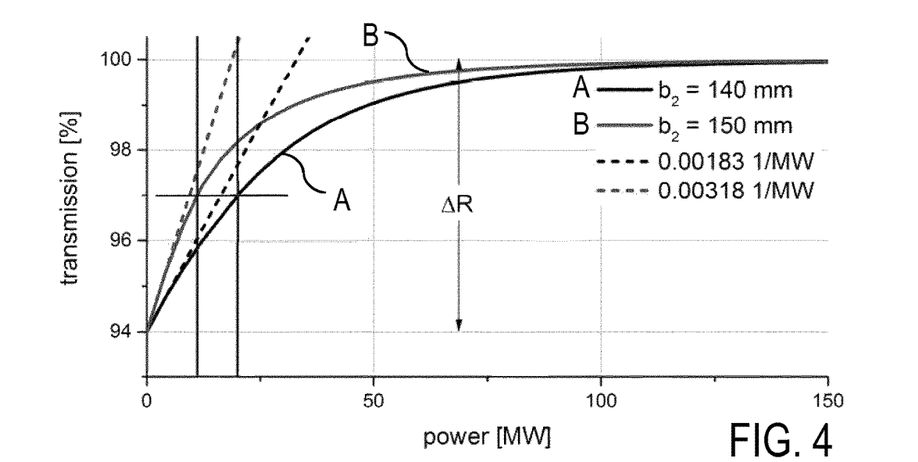
FIGS. 4 to 6: further graphical representations illustration features of the inventive creation of laser pulses.

FIG. 4 shows that the difference in saturation power (vertical intercepts) is almost a factor 2 in the illustrated example. The saturation power is defined here as the power at which the difference in transmission (or more general roundtrip gain) has reached half the value of its maximum, also called modulation-depth $\Delta R$. In practice, the exact shape of the transmission- or gain-curves further depend on the total amount and nature of the intra-cavity apertures as well as gain saturation (see FIG. 4 in [1]). Generally, however, FIG. 4 shows that the saturation-power and the initial slope of the gain-/transmission-curve as well as the total modulation-depth ΔR (with more than one aperture, which is nearly always the case) can be strongly influenced by the position of the Kerr-medium 21.

According to the invention, this behavior is employed such that with a Kerr-medium position (second operation arrangement) being optimized for stable operation and peak-power and/or spectral bandwidth of the laser pulses are significantly higher than in a position (first operation arrangement) that is optimized for reliable starting and pulse-buildup, and/or that the optimized Kerr-medium position (second operation arrangement) allows only single pulses during the cavity-roundtrip time while in the starting-position (first operation arrangement) multiple pulses might form. With the Kerr-medium in the second operation arrangement where peak-power and/or bandwidth of the circulating pulses are optimized the oscillator might refuse to mode-lock even though no damage occurs. This can be the cause of the weak initial slope of the loss-/gain-modulation with instantaneous power. With the inventive setting of the first operation arrangement, this difficulty is eliminated.

The first and second operation arrangements of the Kerr medium 21 are set on the basis of the following considerations. The at least one Kerr-medium used for starting is initially positioned in the first operation arrangement ('starting position') where the saturation-power is decreased with respect to the second operation arrangement ('running position'). The first operation arrangement of the Kerr-medium 21 is preferably found at the Kerr-medium position where the intra-cavity continuous-wave (CW) average power required to initiate mode-locking is minimal. Kerr-lens mode-locking is initiated in the first operation arrangement such that optical damage to intra-cavity elements is avoided. Once the oscillator is mode-locked the at least one Kerr-medium is translated to the second operation arrangement where the saturation power is increased and the saturation power and possibly the modulation depth OR are optimized for higher peak-power and/or bandwidth and/or stability of the pulses.

With a practical example, the first operation arrangement is obtained with a distance $b_1$=120 cm, and the second operation arrangement is obtained with a distance $b_1$=126 cm. During the translation-process the pump-power or gain might have to be adjusted with the operation adjustment device 50 to keep the oscillator mode-locked. The gain is kept at a value that avoids transition to the multi-pulse regime in solitonic oscillators which can also cause chaotic power-spikes. Modulating the gain can be done with the methods mentioned below. With the translation device 40, the Kerr-medium translation is vibration-free such as not to interrupt the mode-locked pulses and itself induce spiking.

If more than one Kerr-medium is present in the oscillator cavity 10, some or all might have to be translated to achieve the desired effect. Each Kerr-medium might have its own first operation arrangement and the Kerr-media might be translated all at once or consecutively in order to reach the second operation arrangement with optimum output power. Providing multiple Kerr media has advantages in terms of more degrees of freedom for adjusting optimum operation conditions of the oscillator.

To safely initiate pulse buildup such a crystal exhibiting a tunable cascaded quadratic nonlinearity might be used in a first operation arrangement such that the intra-cavity nonlinearity and saturation of the self-amplitude modulation is increased relative to a second operation arrangement. In this second operation arrangement the phase-mismatch is changed such that the total intra-cavity nonlinearity is lower and the peak-power and/or spectral bandwidth and/or stability is increased. An implementation of the first and second operation arrangement with cascaded quadratic nonlinearities can be in combination with the previously mentioned translation of two wedges and or translation of the one or more Kerr media along the beam-path. An advantage of using cascaded quadratic nonlinear interactions is the possibility to provide very strong variation of the nonlinear phase-shift per pass and reliable starting of the oscillator without any moving parts in the particular case of temperature-tuning.

The initiation of mode-locking can be achieved by any active or passive means. Active means include e.g. mechanical perturbers such as a manual pusher or a piezo actuator to move one or more cavity mirrors or a vibrator or an active optical modulator such as an acousto- or electro-optical modulator (Pockels cell) or an optical seed-pulse is injected. Starting could also be achieved by modulating the gain such as in synchronous pumping or by periodically depleting the gain by stimulated emission with another laser or by suddenly increasing the gain with an intra-cavity beam attenuator or beam-block or an iris. Passive means can be realized with an auxiliary coupled cavity or by nonlinear polarization-rotation or with a saturable absorber such as a SESAM or graphene or a nonlinear multilayer interference-filter (MAM). All of these can, but do not have to result in a self-starting configuration.

A particular implementation of starting the mode-locked operation can also include moving the two wedges 22, 23, that act as Kerr-medium such as illustrated in FIG. 2. By moving the wedges 22, 23 closer together or further apart (direction indicated by horizontal black arrows) the total effective thickness of the Kerr-medium passed by the pulses can be adjusted. This would result in a tunable saturation of the amplitude modulation, similar to shifting a Kerr-medium in and out of an intra-cavity focus. The wedges 22, 23 might additionally be shifted along the beam-propagation-axis in order to achieve an even greater saturation-effect for starting mode-locking. The wedges 22, 23 could have an anti-reflective coating or be uncoated with a very small wedge-angle such that, when placed inside the beam-path close to Brewster's angle, the reflection-losses are small.

The inventors have found experimental indicators that in some configurations it might also be beneficial to apply the reverse procedure for safely shutting down the mode-locking and reverting to CW-oscillation or complete shutdown of the laser. This might be especially necessary if some intra-cavity elements are very susceptible to thermal shock and the pump/gain has to be ramped up/down slowly. The inventive spike suppression can be applied to the shut-down process as follows.

The at least one Kerr-medium 21 is initially positioned in the second operation arrangement where the saturation-power is increased with respect to a first operation arrangement and the oscillator is in a mode-locked condition with optimized output parameters. In order to safely break the mode-lock and avoid q-switching/spiking or q-switched mode-locking and optical damage to oscillator components the at least one Kerr-medium 21 is translated to the respective first operation arrangement ('shut-down position') where the saturation power is optimized for damage-free shutdown of mode-locking. Upon reaching the first operation arrangement of the at least one Kerr-medium 21 the mode-lock is interrupted such that the oscillator switches to CW oscillation or shuts down completely.

Interruption of mode-locking or shutting down can be achieved by mechanically perturbing the cavity, with an acousto- or electro-optical modulator, by modulating or reducing the gain, by opening an intra-cavity aperture or beam-block or by increasing transmission through an intra-cavity beam-attenuator. The shutdown position might coincide with the starting position and again, if more than one Kerr-medium is present in the oscillator, each Kerr-medium might have its own shutdown position, which might need to be reached all at once or in sequence.

During the translation-process the pump-power or gain might have to be adjusted to keep the oscillator mode-locked and avoid transition to the multi-pulse regime where damage to optical elements might also occur. Again, the Kerr-medium translation is sufficiently smooth such as not to interrupt the mode-locked pulses prematurely and/or induce q-switching/spiking or q-switched mode-locking.

Figure 5:
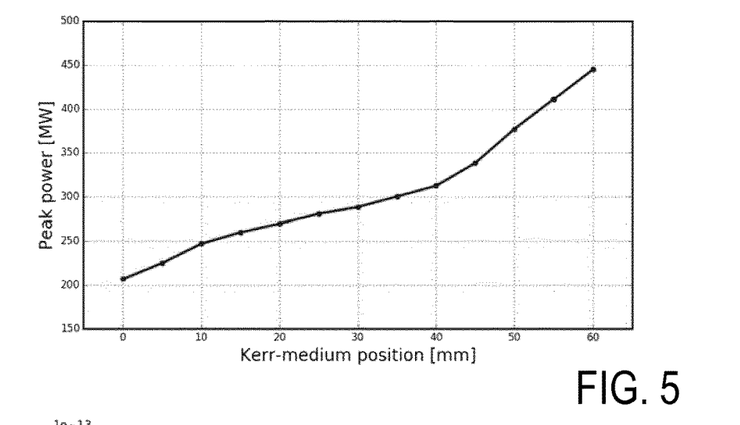

FIG. 5 illustrates the peak power change in the pulse laser apparatus 100 having the resonator set-up of [4] with the Kerr-medium position shifting from the first operation arrangement at 0 mm to a second operation arrangement near 60 mm. Going beyond the optimum position destabilizes the mode-locking. The intra-cavity peak power changes from 200 to 450 MW.

Figure 6:
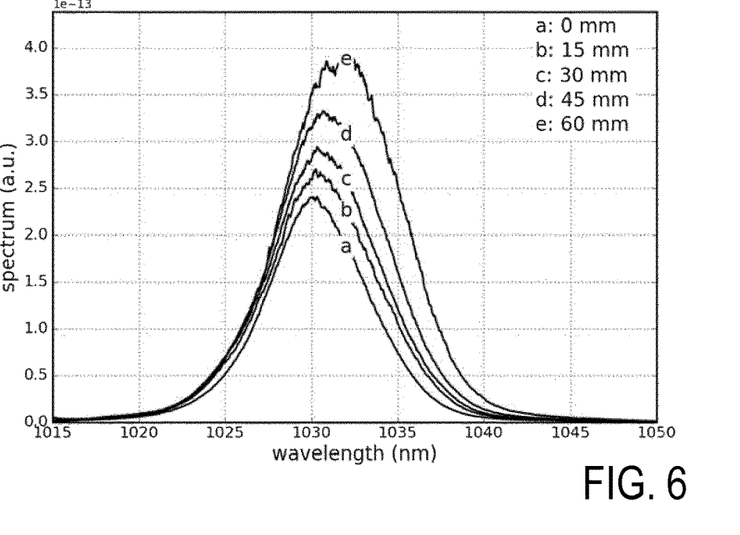

FIG. 6 shows the change in spectral bandwidth of the output pulses as the Kerr-medium shifts from the first operation arrangement to the second operation arrangement. The pulses stay Fourier-limited at all times. Changing the spectral bandwidth can be monitored by the detector device 51 (see FIG. 1) for optimizing the second operation arrangement.

The features of the invention disclosed in the above description, the drawings and the claims can be of significance individually, in combination or sub-combination for the implementation of the invention in its different embodiments.

The invention claimed is:

1. A pulse laser apparatus, configured for creating soliton laser pulses, based on Kerr lens mode locking of a circulating light field in an oscillator cavity, comprising:
   at least two resonator mirrors spanning a resonator beam path of the oscillator cavity,
   at least one Kerr-medium configured for introducing self-phase modulation and self-focusing to the circulating light field in the oscillator cavity,
   at least one gain-medium configured for amplifying the circulating light field in the oscillator cavity,
   a tuning device configured for setting a first mode-locking condition and a second mode-locking condition of the oscillator cavity such that an intra-cavity threshold-power for mode-locking at the first mode-locking condition is lower than that at the second mode-locking condition, and
   the first mode-locking condition is configured for starting or shutting-down of the Kerr lens mode locking and the second mode-locking condition is configured for continuous Kerr lens mode locking, wherein a resonator-internal peak-power of the circulating light field is higher at the second mode-locking condition than at the first mode-locking condition.

2. The pulse laser apparatus according to claim 1, wherein the first mode-locking condition is selected such that the intra-cavity threshold-power for mode-locking is minimized.

3. The pulse laser apparatus according to claim 1, wherein the second mode-locking condition is selected such that the resonator-internal peak-power of the circulating light field is maximized.

4. The pulse laser apparatus according to claim 1, wherein the second mode-locking condition is selected such that the resonator-internal peak-power of the circulating light field is at least 20% higher at the second mode-locking condition than at the first mode-locking condition.

5. The pulse laser apparatus according to claim 1, wherein the at least one gain-medium comprises a thin-disk gain medium provided separately from the at least one Kerr medium.

6. The pulse laser apparatus according to claim 1, wherein the at least one Kerr medium has at least one anti-reflection coating.

7. The pulse laser apparatus according to claim 1, wherein
   the tuning device comprises a translation device being configured for changing an operation arrangement of the at least one Kerr-medium within the oscillator cavity between a first operation arrangement and a second operation arrangement, and
   the first mode-locking condition is provided with the first operation arrangement and the second mode-locking condition is provided with the second operation arrangement of the at least one Kerr-medium.

8. The pulse laser apparatus according to claim 7, wherein the first and second operation arrangements comprise first and second positions of the at least one Kerr-medium along the resonator beam path.

9. The pulse laser apparatus according to claim 7, wherein
   the at least one Kerr-medium comprises a pair of Kerr media wedges, arranged for a translation having a component perpendicular to the resonator beam path such that a total effective thickness of the pair of Kerr media wedges passed by the circulating light field can be adjusted, and
   the first and second operation arrangements comprise first and second positions of the Kerr media wedges along a radial direction relative to the resonator beam path.

10. The pulse laser apparatus according to claim 9, wherein at least one of the Kerr media wedges has at least one anti-reflective coating.

11. The pulse laser apparatus according to claim 9, wherein the Kerr media wedges have a wedge-angle selected such that, when placed in the resonator beam-path close to Brewster's angle, reflection-losses are minimized.

12. The pulse laser apparatus according to claim 7, wherein the translation device is configured for changing the operation arrangement by a vibration-free movement of the at least one Kerr-medium.

13. The pulse laser apparatus according to claim 1, comprising at least two Kerr-media, wherein the translation device is configured for changing an operation arrangement of at least one of the Kerr-media.

14. The pulse laser apparatus according to claim 1, wherein
   the tuning device is configured for changing a phase-mismatch condition of at least one of the at least one Kerr medium and a phase-mismatched type-I second harmonic generation (SHG) crystal arranged in the resonator beam path of the oscillator cavity and configured for adding second order nonlinearity in the oscillator cavity between a first phase-mismatch condition and a second phase-mismatch condition having a larger phase mismatch of the at least one of the at least one Kerr medium and the SHG crystal than the first phase-mismatch condition, the phase-mismatch changed between the first and second mismatch conditions such that a total intra-cavity nonlinearity is lower and at least one of the peak-power and spectral bandwidth and pulse-stability is increased in the second phase-mismatch condition compared with the first phase-mismatch condition, and the first mode-locking condition is provided with the first phase-mismatch condition and the second mode-locking condition is provided with the second phase-mismatch condition.

15. The pulse laser apparatus according to claim 14, wherein the tuning device is configured for tuning at least one of the temperature and an angle of incidence of the at least one of the at least one Kerr medium and the SHG crystal relative to the resonator beam path of the oscillator cavity.

16. The pulse laser apparatus according to claim 1, further comprising an operation adjustment device configured for adjusting at least one of a pump-power and a gain of the at least one gain medium to keep the oscillator cavity mode-locked while changing the mode-locking condition.

17. The pulse laser apparatus according to claim 1, further comprising a detector device arranged for detecting a Kerr lens mode locking state of the oscillator cavity.

18. The pulse laser apparatus according to claim 17, further comprising a control loop arranged for controlling the tuning device in dependency on a detector device output.

19. The pulse laser apparatus according to claim 1, wherein the oscillator cavity is configured for an operation with an intra-cavity oscillator power of at least 50 MW in an anomalous dispersion-regime with negative group-delay-dispersion, or at least 5 MW in a normal dispersion regime with positive group-delay-dispersion producing dissipative solitons.

20. The pulse laser apparatus according to claim 1, including at least one of the features
the at least one gain-medium is configured for providing a soft aperture in the oscillator cavity, and
the oscillator cavity includes a hard aperture.

21. A method of operating a pulse laser apparatus having an oscillator cavity with at least two resonator mirrors spanning a resonator beam path of the oscillator cavity, at least one Kerr-medium configured for introducing self-phase modulation and self-focusing to the circulating light field in the oscillator cavity, and at least one gain-medium configured for amplifying the circulating light field in the oscillator cavity, comprising:
creating soliton laser pulses, based on Kerr lens mode locking of a circulating light field in the oscillator cavity, comprising the steps of:
setting a first mode-locking condition and a second mode-locking condition of the oscillator cavity with a tuning device such that an intra-cavity threshold-power for mode-locking at the first mode-locking condition is lower than that at the second mode-locking condition, wherein
the Kerr lens mode locking is started or shut-down at the first mode-locking condition and a continuous Kerr lens mode locking is provided at the second mode-locking condition, wherein a resonator-internal peak-power of the circulating light field is higher at the second mode-locking condition than at the first mode-locking condition.

22. The method according to claim 21, wherein the intra-cavity threshold-power for mode-locking is minimized at the first mode-locking condition.

23. The method according to claim 21, wherein the resonator-internal peak-power of the circulating light field is maximized at the second mode-locking condition.

24. The method according to claim 21, wherein the resonator-internal peak-power of the circulating light field is at least 20% higher at the second mode-locking condition than at the first mode-locking condition.

25. The method according to claim 21, wherein the step of setting the first mode-locking condition and the second mode-locking condition comprises changing an operation arrangement of the at least one Kerr-medium within the oscillator cavity between a first operation arrangement and a second operation arrangement.

26. The method according to claim 25, wherein the step of changing the operation arrangement of the at least one Kerr-medium between the first and second operation arrangements comprises translating the at least one Kerr-medium along the resonator beam path.

27. The method according to claim 25, wherein
the at least one Kerr-medium comprises a pair of Kerr media wedges, and
the step of changing the operation arrangement of the at least one Kerr-medium between the first and second operation arrangements comprises translating the Kerr media wedges with a component perpendicular to the resonator beam path and adjusting a total effective thickness of the pair of Kerr media wedges passed by the circulating light field, wherein
the first and second operation arrangements comprise first and second positions of the Kerr media wedges along a radial direction relative to the resonator beam path.

28. The method according to claim 25, wherein the step of changing the operation arrangement of the at least one Kerr-medium comprises a vibration-free movement of the at least one Kerr-medium.

29. The method according to claim 25, wherein
at least two Kerr-media are provided for Kerr lens mode locking of the circulating light field in the oscillator cavity, and
the step of changing the operation arrangement comprises moving at least one of the Kerr-media.

30. The method according to claim 21, further comprising adding second order nonlinearity in the oscillator cavity with at least one of the at least one Kerr medium and a phase-mismatched type-I second harmonic generation (SHG) crystal arranged in the resonator beam path of the oscillator cavity, wherein
the step of setting the first mode-locking condition and the second mode-locking condition comprises changing a phase-mismatch condition of the at least one of the at least one Kerr medium and the SHG crystal between a first phase-mismatch condition and a second phase-mismatch condition having a larger phase mismatch of the at least one of the at least one Kerr medium and the SHG crystal than the first phase-mismatch condition, and
the phase-mismatch is changed between the first and second mismatch conditions such that a total intra-cavity nonlinearity is lower and at least one of the peak-power, spectral bandwidth and pulse-stability is increased in the second phase-mismatch condition compared with the first phase-mismatch condition.

31. The method according to claim 30, wherein the first phase-mismatch condition is provided when the at least one Kerr-medium has the first operation arrangement and the second phase-mismatch condition is provided when the at least one Kerr-medium has the second operation arrangement.

32. The method according to claim 30, wherein changing the phase-mismatch condition includes tuning of at least one of the temperature and an angle of incidence of the at least one of the at least one Kerr medium and the SHG crystal relative to the resonator beam path of the oscillator cavity.

33. The method according to claim 21, further comprising a step of adjusting at least one of a pump-power and a gain of the at least one gain medium to keep the oscillator cavity mode-locked while changing the operation arrangement.

34. The method according to claim 21, further comprising a step of detecting a Kerr lens mode locking state.

35. The method according to claim 34, further comprising a step of changing an operation arrangement of the at least one Kerr-medium between the first and second mode-locking conditions by controlling the tuning device in dependency on a detector device output.

36. The method according to claim 21, wherein the oscillator cavity is operated with an intra-cavity oscillator power of at least 50 MW in an anomalous dispersion-regime with negative group-delay-dispersion, or at least 5 MW in a normal dispersion regime with positive group-delay-dispersion producing dissipative solitons.

* * * * *